United States Patent
Takahashi (10) Patent No.: US 6,410,836 B2
(45) Date of Patent: Jun. 25, 2002

(54) ON-KEY INDICATION TECHNIQUE

(75) Inventor: Fumitaka Takahashi, Shizuoka-ken (JP)

(73) Assignee: Kabushiki Kaisha Kawai Gakki Seisakusho, Hamamatsu (JP)

(*) Notice: Subject to any disclaimer, the term of this patent is extended or adjusted under 35 U.S.C. 154(b) by 0 days.

(21) Appl. No.: 09/920,773

(22) Filed: Jul. 31, 2001

(30) Foreign Application Priority Data

Aug. 1, 2000 (JP) ......................................... 2000-232754

(51) Int. Cl.$^7$ .............................................. G09B 15/02
(52) U.S. Cl. .......................................................... 84/478
(58) Field of Search ...................... 84/477 R, 478–482

(56) References Cited

U.S. PATENT DOCUMENTS 4,730,533 A * 3/1988 Schoerkmayr ................ 84/478
5,907,115 A * 5/1999 Matsunaga et al. ....... 84/477 R

* cited by examiner

Primary Examiner—Stanley J. Witkowski
(74) Attorney, Agent, or Firm—Christie, Parker & Hale, LLP (57) ABSTRACT

Provided is an ON-key indicator which allows the player to visually and easily confirm the ON-key timing and strength on a keyboard instrument. A controller begins to turn on the light-emitting element farthest from a key of interest of light-emitting elements provided for the key of interest at a timing (t–n) going back an arbitrary time period n from an ON-key timing t of the key of interest, sequentially turns on the subsequent light-emitting elements, and turns on the light-emitting element closest to the key of interest at the ON-key timing t.

26 Claims, 8 Drawing Sheets

ON-KEY INDICATION TECHNIQUE

CROSS-REFERENCE TO RELATED APPLICATIONS

This application is based upon and claims priority of Japanese Patent Application No. 2000-232754, filed on Aug. 1, 2000, the contents being incorporated herein by reference.

BACKGROUND OF THE INVENTION

1. Field of the Invention

The present invention relates to ON-key indicators used in, e.g., apparatus or systems which allow the user to recognize the ON-key position or timing on a keyboard of a keyboard instrument, electronic musical instrument systems, ON-key indication methods, and storage media which computer-readably store processing steps to implement the methods.

2. Description of the Related Art

Conventionally, some of keyboard instruments such as acoustic pianos, digital pianos, and the like have an ON-key indication function for visually indicating information on keys to be depressed, information on fingers (fingerwork information), and the like for a player by turning on light-emitting diodes (to be referred to as "LEDs" hereinafter) arranged in accordance with the respective keys on a keyboard.

Since such a keyboard instrument can indicate keys to be depressed, fingerwork information, and the like for the player on the basis of performance information, the player can easily play in accordance with the ON states of the LEDs by the ON-key indication function.

However, although the aforementioned conventional ON-key indication function can visually indicate an ON-key position by turning on the corresponding LED, the player can hardly recognize the next ON-key timing and OFF-key timing after a given ON-key event, and cannot recognize the ON-key strength.

For example, the conventional ON-key indication function turns off an LED (corresponding to the current ON key) which was turned on previously, and turns on an LED corresponding to the next key to be depressed, thus making the player recognize the next key. Since the LEDs are turned off and on instantaneously, the player must instantaneously recognize the next key to be depressed in accordance with such an ON/OFF pattern. It is very difficult especially for a player who is not accustomed with a keyboard instrument to make such instantaneous recognition of keys and fingerwork accordingly, resulting in a clumsy performance.

Also, the conventional function does not allow the player to recognize the ON-key strength, resulting in a not only clumsy but also flat performance.

SUMMARY OF THE INVENTION

It is an object of the present invention to provide ON-key indicators which allow the player to easily make a desired performance since the player can visually and easily recognize the ON-key timing and strength, electronic musical instrument systems, ON-key indication methods, and storage media which computer-readably store processing steps to implement the methods.

According to the present invention, provided is an ON-key indicator for indicating at least an ON-key position and timing of a keyboard on the basis of input performance information, characterized by comprising a plurality of light-emitting elements which are provided for each key on the keyboard, and line up in a direction perpendicular to the pitch direction of the keyboard, and a controller for controlling ON and OFF operations of the plurality of light-emitting elements, and in that the controller shifts an ON position of the plurality of light-emitting elements in turn from the upper light-emitting element toward a key of interest.

More specifically, a plurality of light-emitting elements (LEDs or the like) are provided to each key on a keyboard. If "t" represents the ON-key timing of a given key, the plurality of light-emitting elements provided to that key begin to be turned on in turn from the uppermost light-emitting element farthest from the key toward the key at a timing (t−n) going back an arbitrary time period n from that timing t. At the timing t, the light-emitting element closest to the key is turned on.

Therefore, when the plurality of light-emitting elements of a given key begin to be turned on, the player can recognize that the ON-key timing of that key is close, can recognize the ON-key timing of the key when the ON position shifts toward the key and reaches the position closest to the key, and can depress the key at that timing.

DETAILED DESCRIPTION OF THE PREFERRED EMBODIMENTS

Preferred embodiments of the present invention will be described below with reference to the accompanying drawings.

First Embodiment

Figure 1:
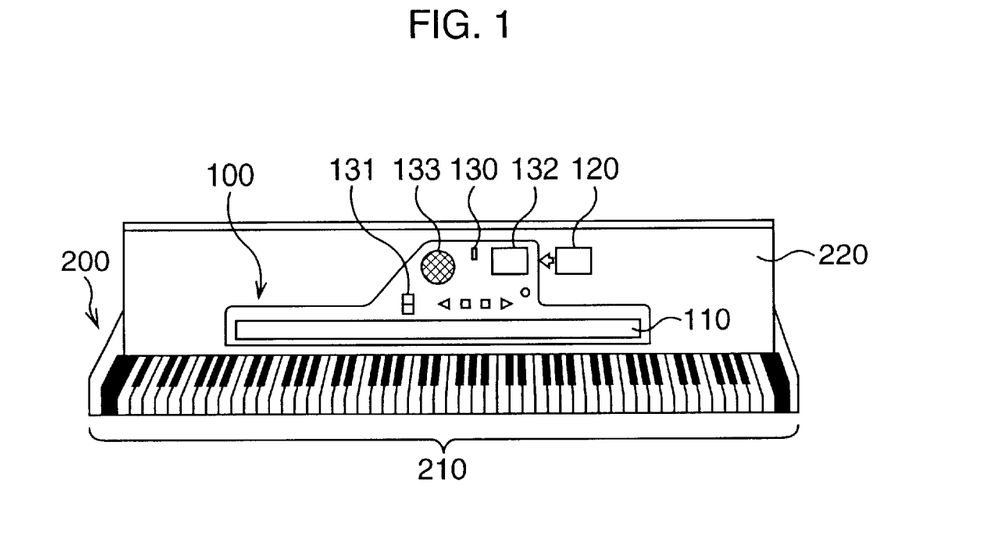
FIG. 1 is a perspective view for explaining the construction of an ON-key indicator according to the first embodiment of the present invention.

The present invention is applied to, e.g., an ON-key indicator 100, as shown in FIG. 1.

The ON-key indicator 100 can be attached to the back surface of a keyboard cover 220 with suckers at a position neighboring a keyboard 210 of a piano 200.

The ON-key indicator 100 comprises a keyboard-type surface emission plate 110 for visually indicating the ON-key position, strength, and the like for the player.

As will be described later in detail, the surface emission plate 110 has LED groups each consisting of a plurality of LEDs in accordance with keys of the keyboard 210 of the piano 200. The ON-key position and strength are visually presented to the player by the ON/OFF states and timings of the respective LEDs of each LED group.

The ON/OFF states, timings, and the like of the LEDs on the surface emission plate 110 are controlled in accordance with performance information stored in self-teaching software 120 set in a slot (not shown).

Note that the self-teaching software 120 is provided as, e.g., a ROM card.

The ON-key indicator comprises a display/control panel 130.

On the display/control panel 130, a switch for starting to load performance information stored in the self-teaching software 120 into the indicator 100, a select key 131 used to select a performance and an ON/OFF schedule (to be also referred to as an "emission schedule" hereinafter) of LEDs on the surface emission plate 110, a display 132 for displaying on the screen various kinds of information (the title of a tune, the performance of which is in progress, tempo, the number of bars, the right or left hand used to depress a key, and the like) designated by the performance information, and a loudspeaker 133 for producing accompanying tones are provided.

Figure 2:
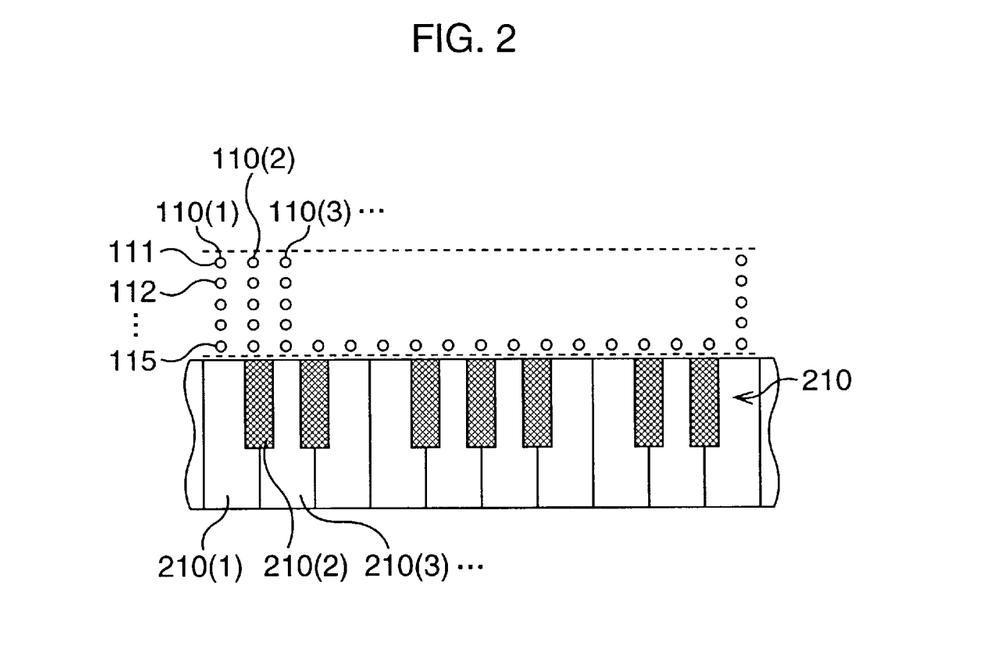
FIG. 2 is a view for explaining the construction of a surface emission plate of the ON-key indicator.

FIG. 2 shows the details of the construction of the surface emission plate 110.

The surface emission plate 110 comprises LED groups 110(1), 110(2), 110(3), . . . corresponding to keys 210(1), 210(2), 210(3), . . . of the keyboard 210 of the piano 200, as shown in FIG. 2.

Each of the LED groups 110(1), 110(2), 110(3), . . . includes a plurality of LEDs (five LEDs in FIG. 2) which line up vertically.

Note that the number of LEDs in each of the LED groups 110(1), 110(2), 110(3), . . . is five for the sake of simplicity, but the present invention is not limited to this.

Figure 3:
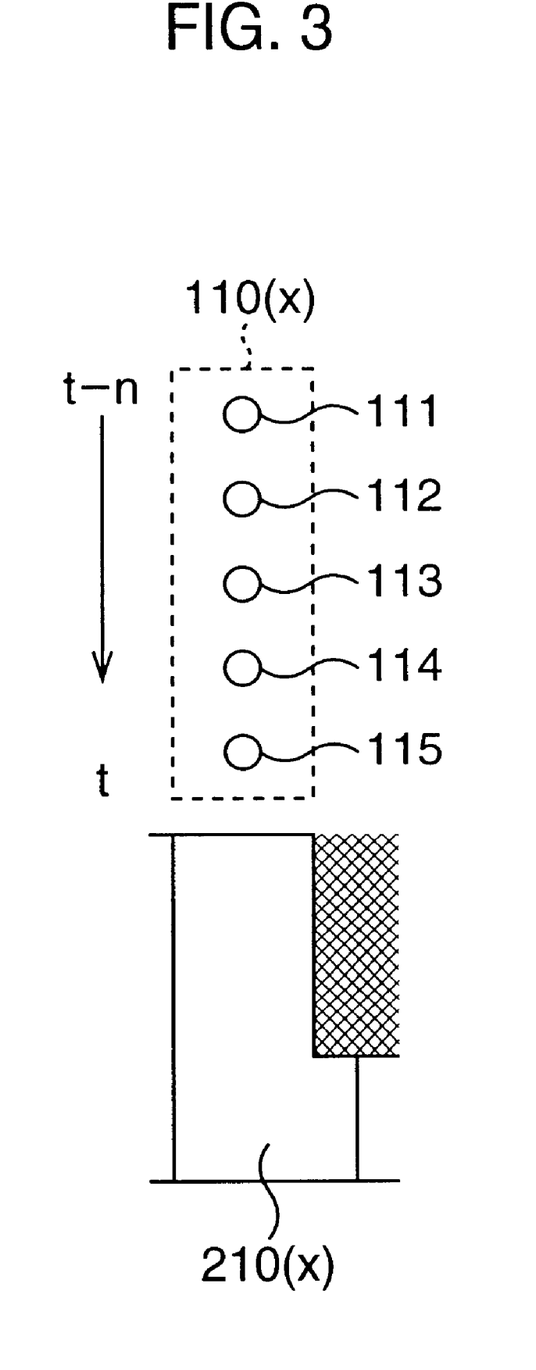
FIG. 3 is a view for explaining the arrangement in an LED group on the surface emission plate.

FIG. 3 shows a state wherein an LED group 110(X) on the surface emission plate 110 shown in FIG. 2 corresponding to an arbitrary key 210(X) is noted.

For example, let "t" be the ON-key timing of the key 210(X). The uppermost LED 111 of the LED group 110(X) is turned on an arbitrary time period n before the timing t, the ON position shifts to subsequent LEDs 112, 113, and 114 in accordance with a predetermined ON schedule (emission schedule), and the lowermost LED 115 is turned on at the timing t (at which the key 210(X) is to be depressed).

Therefore, the player can depress the key 210(X) at the ON timing of the lowermost LED 115 after the uppermost LED 111 is turned on first, and the ON position shifts in turn to the LEDs 112, 113, and 114.

Note that the surface emission plate 110 may correspond to keys within a range excluding some higher and lower keys of the piano, or the full range of the piano 200, e.g., all the 88 keys.

Figure 4:
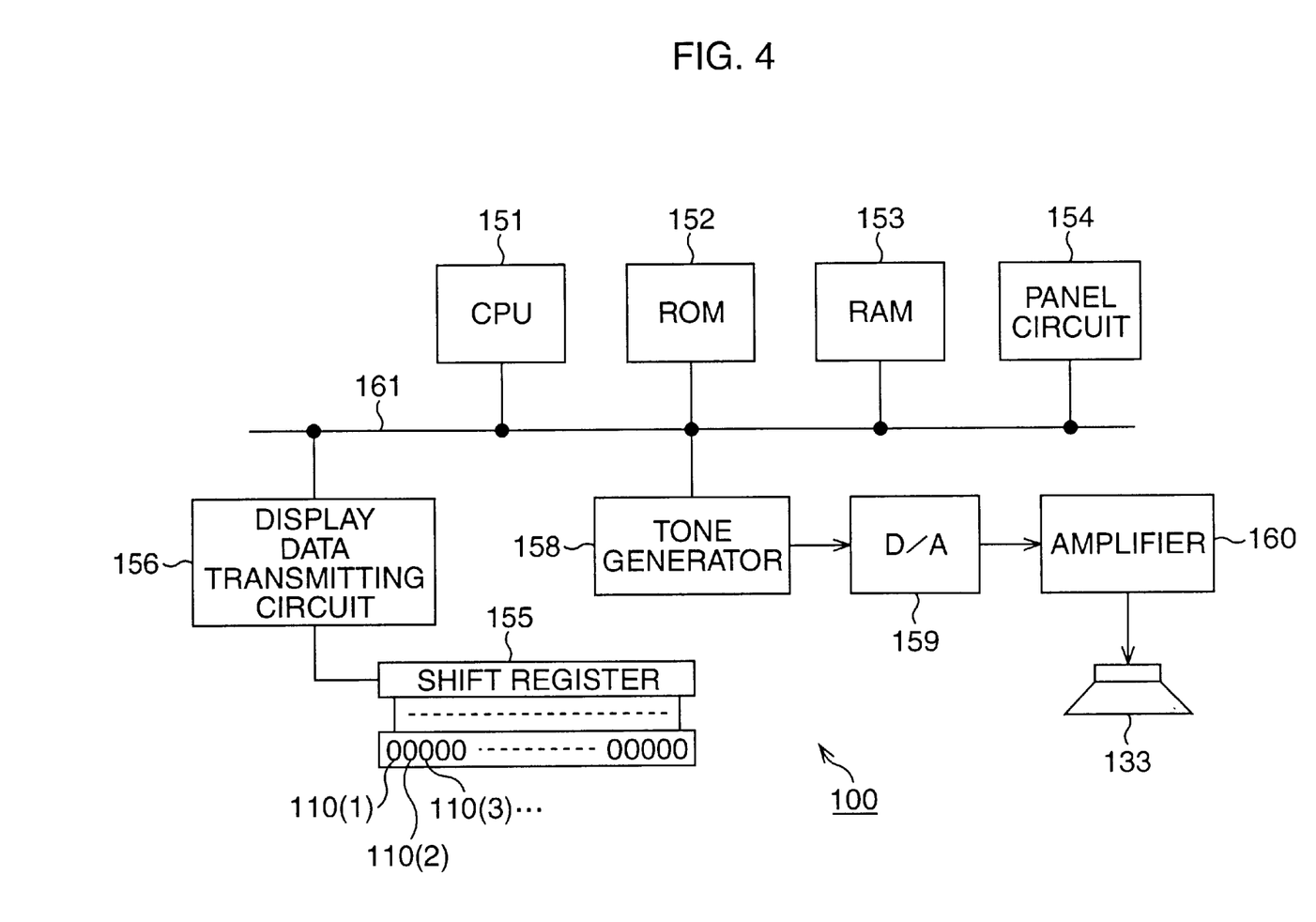
FIG. 4 is a block diagram showing the internal construction of the ON-key indicator.

FIG. 4 shows the internal construction of the surface emission plate 110.

In the surface emission plate 110, a CPU 151, a ROM 152, a RAM 153, a panel circuit 154, an indication data transmitting circuit 156, and a tone generator 158 are connected so that they can exchange data with each other via a bus 161, as shown in FIG. 4.

The loudspeaker 133 is connected to the tone generator 158 through a digital/analog (D/A) converter 159 and an amplifier 160, and the LED groups 110(1), 110(2), 110(3), . . . are connected to the indication data transmitting circuit 156 through a shift register 155.

The CPU 151 reads out and executes a control program pre-stored in the ROM 152 to control the operation of the overall indicator 100. The CPU 151 has a connection port for connecting the self-teaching software 120.

The ROM 152 stores the control program to be executed by the CPU 151, tone waveform data, envelope control information, and the like.

The RAM 153 is used as a work area, a buffer, and the like for the CPU 151. The RAM 153 may be backed up by, e.g., a battery or the like.

The panel circuit 154 includes an interface circuit for various keys and switches such as the select key 131 and the like, the display 132, and the like on the display/control panel 130.

The performance information stored in the self-teaching software 120 includes note information (note data), i.e., information on tone pitches and durations, information indicating whether the note data corresponds to a melody or accompaniment, tone generation timing information, and fingerwork information indicating fingers used.

The shift register 155 receives and holds the LED control data generated by the CPU 151 based on the note data via the indication data transmitting circuit 156 (to be described later), so as to control the ON/OFF states and timings of the LEDs in the LED groups 110(1), 110(2), 110(3), . . . , as described above with reference to FIG. 3.

The shift register 155 has stages corresponding in number to the LEDs of each of the LED groups 110(1), 110(2), 110(3), . . . .

The output terminal of the shift register 155 is connected to the base of a switching element (not shown), and each LED is connected to a power supply through the switching element.

The switching element is selected to turn on the LED when bit information indicated by the LED control data transferred to the shift register 155 is "0"; to turn off the LED when it is "1".

The indication data transmitting circuit 156 includes a signal output shift register (not shown). The indication data transmitting circuit 156 outputs bit information on the LED control data corresponding to the respective LEDs of the LED groups 110(1), 110(2), 110(3), . . . as a serial signal, and also a shift pulse of the shift register 155 in synchronism with that signal under the control of the CPU 151.

Therefore, the bit information on the LED control data for the respective LEDs of the LED groups 110(1), 110(2), 110(3), . . . can be transferred simultaneously. The transfer rate at that time is set to be, e.g., several hundreds kbits/sec or higher so that flickering of the ON LED upon transfer is not perceptible to the human eyes.

Note that a parallel buffer that latches the bit information to be transferred to the shift register 155 may be provided in place of the shift register 155. In this case, low-speed transfer is allowed.

The tone generator 158 generates a desired tone signal by a waveform read-out scheme. That is, the tone generator 158 sequentially reads out waveform data at address intervals proportional to the pitches of tones to be produced with reference to the waveform data as digital tone waveform sample values stored in the ROM 152, and generates a tone waveform signal by interpolating the read-out data.

The tone generator 158 has an envelope generation circuit for giving an envelope by multiplying the tone waveform signal by an envelope signal based on set envelope parameters.

The D/A converter 159 converts a tone signal (digital signal) generated by the tone generator 158 into an analog signal.

The analog tone signal converted by the D/A converter 159 is amplified by the amplifier 160, and is produced as actual tones through the loudspeaker 133.

Figure 5:
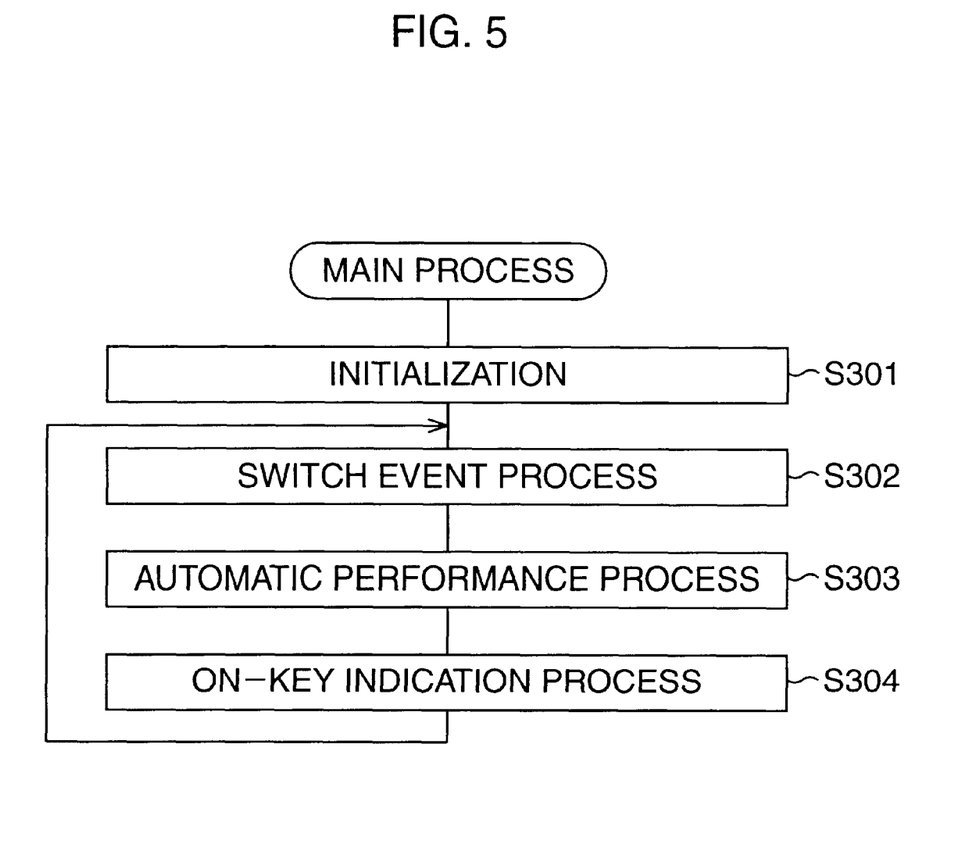
FIG. 5 is a flowchart showing the main process of a CPU in the ON-key indicator.

FIG. 5 shows the main process in the CPU 151.

When the CPU 151 reads out and executes a control program according to the flowchart of FIG. 5, the following process is done.

The CPU 151 initializes the RAM 153, the tone generator 158, and the like (step S301).

The CPU 151 accesses the panel circuit 154 to detect a change in status of the switches and the like on the display/control panel 130, and executes a preset switch event process based on the detection result (step S302).

The CPU 151 then executes an automatic performance process based on performance information downloaded from the self-teaching software 120 (step S303).

In the automatic performance process, an automatic performance timer, i.e., a timing counter, which is updated by a timer interrupt, is incremented in proportion to the tempo of a tune. When the value of the automatic performance timer matches timing information on each tone generation data in the performance information, i.e., when a given tone generation timing has been reached, a tone is produced according to that tone generation data.

In the automatic performance process in step S303, the performance information downloaded from the self-teaching software 120 is demultiplexed into performance information used only in tone generation, and that used only in control (ON-key indication control) of the respective LEDs of the LED groups 110(1), 110(2), 110(3), . . . , and only the performance information used in tone generation is processed.

For example, note data of a melody are used in the ON-key indication control, and those of an accompaniment are used in tone generation.

Note that the performance information can be demultiplexed based on information indicating a melody or accompaniment contained in the note data. The process for demultiplexing the performance information and making an automatic performance is known as a so-called "minus-one function".

The CPU 151 then executes an ON-key indication control process (step S304).

In the ON-key indication control process, a process for indicating the ON-key position, next ON-key position, and their ON-key timings by means of the ON/OFF states and timings of the LEDs in the LED groups 110(1), 110(2), 110(3), . . . on the basis of the performance information downloaded from the self-teaching software 120 is executed.

Note that the performance information used in the ON-key indication process in step S304 is information (information on a melody part and the like) obtained by excluding the performance information used in the automatic performance process in step S303 from the performance information downloaded from the self-teaching software 120.

The CPU 151 repeats the aforementioned processes from step S302 after the process in step S304.

FIGS. 6a to 6e show an example of the ON/OFF states of the LEDs in an LED group 110(X) corresponding to an arbitrary key 210(X) by the ON-key indication control process shown in FIG. 5.

For example, if the performance information indicates that the key 210(X) is to be depressed at a timing "t", the CPU 151 starts the following ON-key indication control process for the LED group 110(X) from a timing a time period n (=4a, a: an arbitrary constant) before the timing t.

Figure 6A:
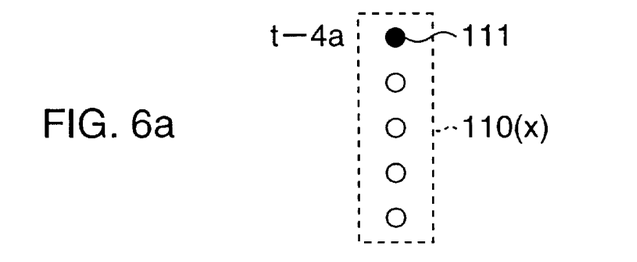
FIGS. 6a to 6e show the way the ON LED position in the LED group shifts.
Figure 6B:
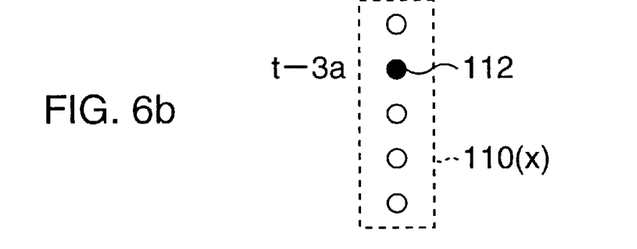

Initially, the LED 111 farthest from the key 210(X) is turned on at a timing (t−4a) (see FIG. 6a). After an elapse of time period a, i.e., at a timing (t−3a), the LED 111 is turned off, and the next LED 112 is turned on (see FIG. 6b).

Figure 6C:
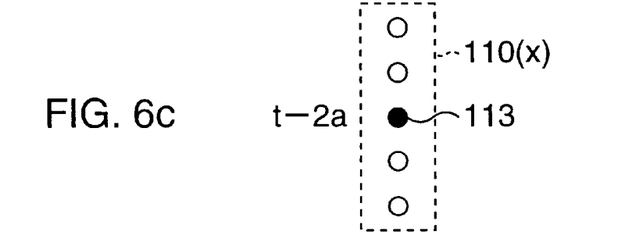

After an elapse of another time period a (at a timing (t−2a)), the LED 112 is turned off, and the next LED 113 is turned on (see FIG. 6c).

Figure 6D:
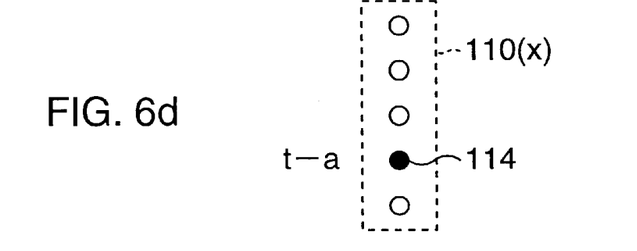
Figure 6E:
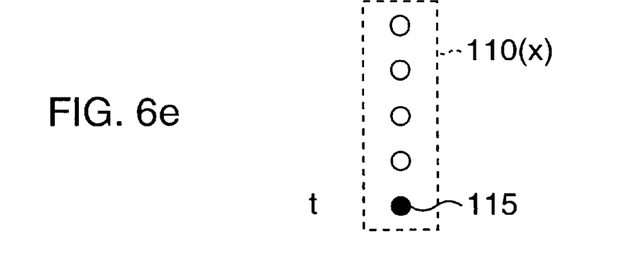

Likewise, after an elapse of still another time period a (at a timing (t−a)), the LED 113 is turned off, and the next LED 114 is turned on (see FIG. 6d). After an elapse of still another time period a, i.e., at the timing t at which the key 210(X) is to be depressed, the LED 114 is turned off, and the LED 115 closest to the key 210(X) is turned on (see FIG. 6e).

As described above, in this embodiment, the LED 111 farthest from the key 210(X) begins to be turned on from the timing (t−4a) before the ON-key timing of the key 210(X), the ON position shifts toward the key 210(X) in the order of LEDs 112, 113, and 114, and the ON timing of the LED 115 closest to the key 210(X) indicates the ON-key timing of the key 210(X).

In this way, since the player can easily recognize the next key to be depressed beforehand without feeling nervous (since he or she must depress the key just at the ON timing of the LED in the conventional apparatus) and can easily recognize that the ON-key timing gradually comes closer, he or she can easily depress that key at an accurate timing.

Figure 7:
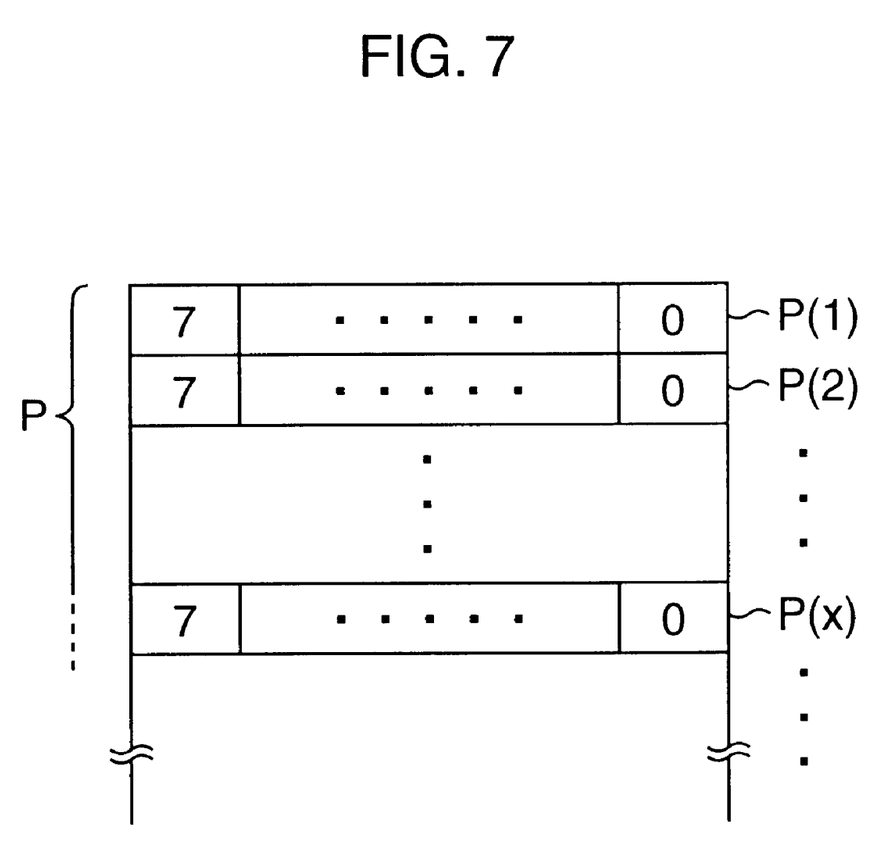
FIG. 7 is a representation for explaining a storage area used for an ON-key indication process by turning on LEDs in the LED group.

FIG. 7 shows the storage area of the RAM 153 used in the ON-key timing indication process.

As described above, the CPU 151 transfers LED control data generated from the performance information (note data) to the shift register 155 via the indication data transmitting circuit 156 so as to execute the ON-key indication control process. The shift register 155 holds the LED control data in the RAM 153. At this time, the RAM 153 stores data as follows.

A storage area P includes fields P(1), P(2), . . . , P(X). These fields P(1), P(2), . . . , P(X) correspond to the LED groups 110(1), 110(2), 110(3), . . . , 110(X), and store bit information on the LED control data corresponding to each LED.

If bit information is "0", it indicates to turn on the LED; if it is "1", it indicates to turn off the LED.

In FIG. 7, each of the fields P(1), P(2), . . . , P(X) is an 8-bit field. However, the field to be actually used is a 5-bit field corresponding to five LEDs that form the LED group.

Figure 8:
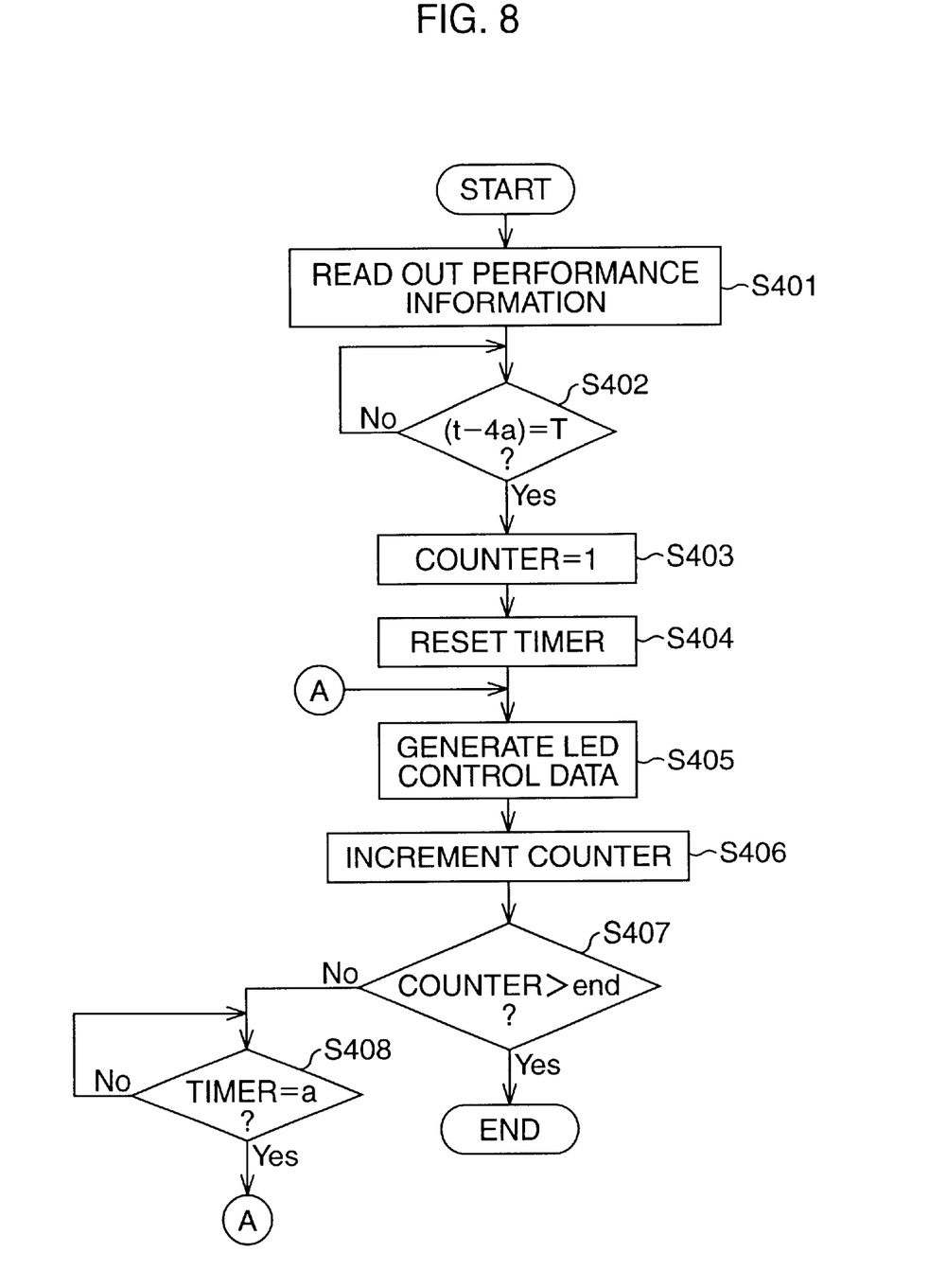
FIG. 8 is a flowchart for explaining the storage process of LED control data in the storage area.

For example, the field P(X) stores bit information on the LED control data of the LEDs 111 to 115 of the LED group 110(X), and the information stored in the field P(X) is updated every time the time period a elapses. FIG. 8 is a flowchart showing the process executed at that time.

The CPU 151 reads out one piece of performance information (performance information on a melody which is to undergo the ON-key indication process) (step S401), and checks if a timing (t−4a) obtained by subtracting a time period 4a from timing information (information on the ON-key timing t of the key 210(X)) is current time T (step S402).

If it is determined that "(t−4a)≠ T", the control waits.

If it is determined in step S402 that "(t−4a)=T", the CPU 151 sets "1" in a processing counter indicating the LED to be turned on (step S403), and resets an internal timer used to measure an elapse of the time period a (step S404).

Note that values 1, 2, 3, . . . of the processing counter indicate the LEDs 111, 112, 113, . . . in turn from the LED 111 farthest from the key 210(X).

The CPU 151 generates LED control data that instructs to turn on the LED indicated by the processing counter in the LED group 110(X) corresponding to the key 210(X) to be depressed indicated by the performance information, and transfers it to the shift register 155 via the indication data transmitting circuit 156 (step S405).

For example, if the processing counter indicates the LED 111, the CPU 151 generates LED control data in which bit information for the LED 111 is "0", and that for other LEDs 112 to 115 is "1", and transfers it to go the shift register 155 via the indication data transmitting circuit 156. In this manner, the field P(X) corresponding to the LED group 110(X) in the storage area P on the RAM 153 stores that LED control data, which turns on the LED 111, and turns off other LEDs 112 to 115. That is, in the LED group 110(X) corresponding to the key 210(X), the LED 111 begins to be turned on at a timing (t−4a) going back a time period 4a from the ON-key timing of the key 210(X).

The CPU 151 increments the processing counter (step S406).

The CPU 151 then checks if the processing counter exceeds the total number "end" (end=5 in this embodiment) of LEDs in the LED group 110(X) (step S407).

If it is determined that "processing counter >end", this processing ends.

On the other hand, if it is determined in step S407 to be not "processing counter >end", the CPU 151 checks based on the internal timer value if the time period a has elapsed (step S408).

If it is determined that the time period a has not elapsed yet, the control waits.

If it is determined in step S408 that the time period a has elapsed, the flow returns to step S405 to turn on the next LED, i.e., to shift the current ON LED position to the next LED, and the CPU 151 repeats the subsequent processing steps.

Second Embodiment

In this embodiment, in the ON-key indicator 100 shown in FIG. 1, each of the LED groups 110(1), 110(2), 110(3), . . . has the following construction.

In each of the LED groups 110(1), 110(2), 110(3), . . . , the shift time of the ON LED position (emission transition time) changes depending on the attack strength.

More specifically, the CPU 151 sets the value of the aforementioned time period a that serves as a reference of the emission transition time in accordance with information on the ON-key strength (f (forte), p (piano), or the like) indicated by the performance information to be processed.

For example, since the ON LED position shifts slowly in case of piano and quickly in case of forte, the player can easily recognize both the ON-key timing and strength.

Third Embodiment

In this embodiment, in the ON-key indicator 100 shown in FIG. 1, each of the LED groups 110(1), 110(2), 110(3), . . . has the following construction.

For example, as described in the first embodiment, the LED 111 farthest from the key 210(X) in the LED group III(X) begins to be turned on at the timing (t−4a) going back a time period 4a from the ON-key timing t of the key 210(X). At the same time, an ON-key control process for turning on other LEDs 112 to 115 with lower light amount is executed.

In this manner, the ON LED position that indicates the ON-key position shifts to trace the LEDs 111 to 115 which are ON with lower light amount.

The CPU 151 executes an ON-key control process for turning off all the LEDs 111 to 115, which were turned on with lower light amount, at the OFF timing of the. last LED 115.

Therefore, according to this embodiment, the player can recognize the key to be depressed more easily.

Fourth Embodiment

Figure 9:
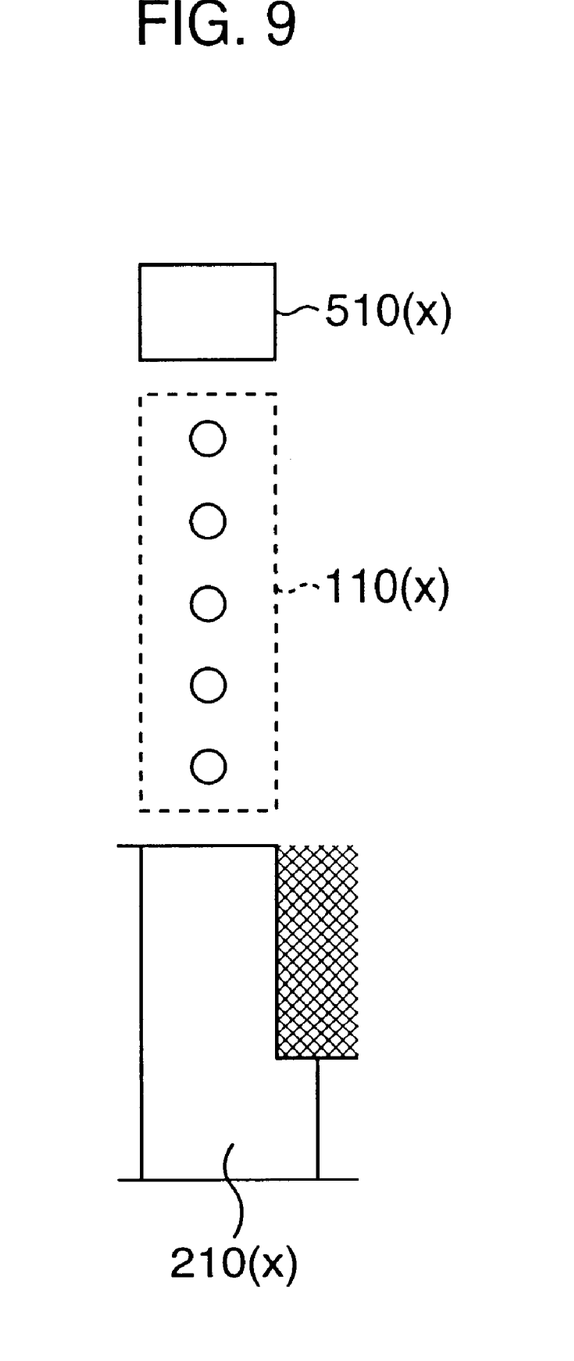
FIG. 9 is a view for explaining the arrangement in an LED group according to the fourth embodiment of the present invention.

In this embodiment, in the ON-key indicator 100 shown in FIG. 1, each of the LED groups 110(1), 110(2), 110(3), . . . has a construction, as shown in, e.g., FIG. 9.

That is, taking an arbitrary LED group 110(X) of the LED groups 110(1), 110(2), 110(3), . . . as an example, it further comprises a number LED 510(X), as shown in FIG. 9.

The CPU 151 executes an ON-key control process for displaying a number indicating the finger that depresses the key 210(X) on the number LED 510(X) at the ON timing of the first LED 111 on the basis of the fingerwork information of the performance information to be processed.

In this way, the player can easily recognize the finger used to depress the key 210(X) as well as its ON-key timing.

Note that the present invention is not limited to the first to fourth embodiments, and can also be applied to other embodiments (1) to (9) as described below.

(1) The performance information used in the ON-key indicator 100 is not limited to information downloaded from the self-teaching software 120. For example, the performance information may have been incorporated in advance in the indicator 100 or may be downloaded from a delivery site on a network such as Internet or the like via an external personal computer, a portable phone that can establish connection to the network, or the like.

(2) In the LED groups 110(1), 110(2), 110(3), . . . the LED closest to the key may use a relatively high-luminance LED.

For example, the LED 115 in the LED group 110(1) comprises a relatively high-luminance LED. With this construction, when the LED 115 is turned on, i.e., when the ON-key timing of the key 210(X) is reached, since the key 210(X) is illuminated with light emitted by the ON LED 115, the player can recognize the key 210(X) more reliably.

(3) The player may arbitrarily select one of a plurality of different emission schedules prepared in advance using the select key 131 on the display/control panel 130, and may also select the emission transition time.

In this case, the CPU 151 executes an ON-key control process on the basis of the player's choice with the select key 131 on the display/control panel 130.

(4) Upon setting the ON-key indicator 100 on the keyboard 210, it engages with the projecting positions of the sharps and flats to determine its horizontal position. At this time, a projection on the navigator side which is to engage with the sharps and flats may be slidable to add a transpose function by changing the pitch to be played back depending on the position of the indicator 100 where the projection is set.

(5) For example, when the key 210(X) is depressed successively, a plurality of LEDs in the LED group 110(X) may be turned on.

Likewise, in case of a chord play, LEDs in a plurality of LED groups corresponding to a plurality of keys may be turned on parallelly.

(6) The ON-key indicator 100 may be splittable or foldable into a plurality of parts. In this manner, even when the ON-key indicator 100 is elongated so as to correspond to a keyboard for several octaves, difficulty in storage, transportation, and the like can be avoided.

For example, when the ON-key indicator 100 is splittable into a plurality of parts, each building part may be solely usable. In this way, such building part can be used in a single-hand practice for a few octaves.

(7) When the pitch of tone data cannot be covered by the LED groups of the ON-key indicator 100 (exceeds the ON-key indication range), the LED group of the closest key corresponding to the same tone name may be used. In such a case, to make the player recognize this situation, the LED of that LED group farthest from the key may be turned on.

(8) Display of fingerwork information is not limited to the number LED 510(X) shown in FIG. 9. For example, in place of the number LED 510(X), two sets of five light-emitting members indicating the finger to be used of the right and left hands may be provided on the right and left sides of the LED group 110(X).

Also, the number LED 510(X) shown in FIG. 9 may indicate the fingerwork information by color (five colors corresponding to the fingers) in place of a number.

(9) In the LED groups 110(1), 110(2), 110(3), . . . all the LEDs 111 to 115 may be turned on with maximum light amount while changing their color at the ON W timing of the LED 115, i.e., at the ON-key timing.

The objects of the present invention are also achieved by supplying a storage medium, which stores a program code of software that can implement the functions of a host and terminal of the first to fourth embodiments or other embodiments (1) to (9) to a system or apparatus, and reading out and executing the program code stored in the storage medium by a computer (or a CPU or MPU) of the system or apparatus.

In this case, the program code itself read out from the storage medium implements the functions of the first to fourth embodiments or other embodiments (1) to (9), and the storage medium which stores the program code constitutes the present invention.

As the storage medium for supplying the program code, for example, a ROM, a floppy disk, a hard disk, an optical disk, a magneto-optical disk, a CD-ROM, a CD-R, a magnetic tape, a nonvolatile memory card, and the like may be used.

The functions of the first to fourth embodiments or other embodiments (1) to (9) may be implemented not only by executing the read-out program code by the computer but also by some or all of actual processing operations executed by an OS running on the computer on the basis of an instruction of the program code.

Furthermore, the functions of the first to fourth embodiments or other embodiments (1) to (9) may be implemented by some or all of actual processing operations executed by a CPU or the like arranged in a function extension board or a function extension unit, which is inserted in or connected to the computer, after the program code read out from the storage medium is written in a memory of the extension board or unit.

As described above, according to the present invention, when the ON-key timing of a key of interest comes closer, the ON position of a plurality of light-emitting elements provided for the key of interest shifts from the uppermost position separated from the key of interest toward the key of interest, and the light-emitting element closest to the key of interest is turned on at the ON-key timing.

In this way, since the player can easily recognize the next key to be depressed beforehand without feeling nervous (since he or she must depress the key just at the ON timing of the LED in the conventional apparatus) and can easily recognize that the ON-key timing gradually comes closer, he or she can easily depress that key at an accurate timing.

When the shift time of the ON position of the light-emitting elements can be changed in accordance with the ON-key strength, since the ON position can shift quickly in the plurality of light-emitting elements corresponding to a key to be depressed strongly, and slowly in the plurality of light-emitting elements corresponding to a key to be depressed weakly, the player can easily recognize the ON-key strength as well as the ON-key timing.

When the uppermost light-emitting element separated from the key of interest is turned on, and all the light-emitting elements are also turned on with a light amount (first light amount) lower than that (second light amount) of the uppermost light-emitting element, the player can recognize the key, the ON-key timing of which is closer, more clearly.

When a display unit for fingerwork information (fingerwork information display unit) is provided in combination with the plurality of light-emitting elements, the player can easily recognize the finger to be used as well as the ON-key timing.

The above embodiments are examples of the present invention and should not be construed to limit the technical range of the present invention. That is, the present invention can be practiced in various forms without departing from its technical spirit and scope or major features.

What is claimed is:

1. An ON-key indicator for indicating at least an ON-key position and timing of a keyboard on the basis of input performance information, comprising:

a plurality of light-emitting means provided for each key on said keyboard, and lining up in a direction perpendicular to the pitch direction of said keyboard; and control means for controlling ON and OFF operations of said plurality of light-emitting means, wherein said control means shifts an ON position of said plurality of light-emitting means in turn from the upper light-emitting means toward a key of interest, on the basis of an ON-key timing of the key of interest.

2. The indicator according to claim 1, wherein said control means turns off the currently ON light-emitting means at an ON timing of the next light-emitting means.

3. The indicator according to claim 1, wherein said control means begins to turn on the light-emitting means farthest from the key of interest at a timing going back an arbitrary time period from said ON-key timing, sequentially turns on the subsequent light-emitting means, and turns on the light-emitting means closest to the key of interest at said ON-key timing.

4. The indicator according to claim 1, wherein said control means turns on all of said plurality of light-emitting means with a first light amount and begins to turn on the light-emitting means farthest from the key of interest with a second light amount higher than said first light amount at a timing going back an arbitrary time period from said ON-key timing, sequentially turns on the subsequent light-emitting means with said second light amount, and turns on the light-emitting means closest to the key of interest with said second light amount at said ON-key timing.

5. The indicator according to claim 1, wherein said control means changes a shift time of said ON position on the basis of ON-key strength information of the key of interest.

6. The indicator according to claim 1, further comprising fingerwork information display means for displaying fingerwork information of the key of interest, wherein said control means controls display on said fingerwork information display means as well as said plurality of light-emitting means.

7. The indicator according to claim 6, wherein said control means starts display on said fingerwork information display means at an ON timing of the light-emitting means farthest from the key of interest.

8. An electronic musical instrument system comprising at least an apparatus or system for providing performance information in a keyboard instrument, and an ON-key indicator which can communicate with said apparatus or system, said ON-key indicator being an ON-key indicator for indicating at least an ON-key position and timing of a keyboard on the basis of input performance information, comprising:

a plurality of light-emitting means provided for each key on said keyboard, and lining up in a direction perpendicular to the pitch direction of said keyboard; and control means for controlling ON and OFF operations of said plurality of light-emitting means, wherein said control means shifts an ON position of said plurality of light-emitting means in turn from the upper light-emitting means toward a key of interest, on the basis of an ON-key timing of the key of interest.

9. The system according to claim 8, wherein said control means turns off the currently ON light-emitting means at an ON timing of the next light-emitting means.

10. The system according to claim 8, wherein said control means begins to turn on the light-emitting means farthest from the key of interest at a timing going back an arbitrary time period from said ON-key timing, sequentially turns on the subsequent light-emitting means, and turns on the light-emitting means closest to the key of interest at said ON-key timing.

11. The system according to claim 8, wherein said control means turns on all of said plurality of light-emitting means with a first light amount and begins to turn on the light-emitting means farthest from the key of interest with a second light amount higher than said first light amount at a timing going back an arbitrary time period from said ON-key timing, sequentially turns on the subsequent light-emitting means with said second light amount, and turns on the light-emitting means closest to the key of interest with said second light amount at said ON-key timing.

12. The system according to claim 8, wherein said control means changes a shift time of said ON position on the basis of ON-key strength information of the key of interest.

13. The system according to claim 8, wherein said ON-key indicator further comprises fingerwork information display means for displaying fingerwork information of the key of interest, and said control means controls display on said fingerwork information display means as well as said plurality of light-emitting means.

14. The system according to claim 13, wherein said control means starts display on said fingerwork information display means at an ON timing of the light-emitting means farthest from the key of interest.

15. An ON-key indication method for indicating at least an ON-key position and timing of a keyboard on the basis of input performance information, comprising:

the control step of controlling ON and OFF operations of a plurality of light-emitting means provided for each key on said keyboard, and lining up in a direction perpendicular to the pitch direction of said keyboard, said control step including the step of shifting an ON position of said plurality of light-emitting means in turn from the upper light-emitting means toward a key of interest.

16. The method according to claim 15, wherein said control step includes the step of turning on all of said plurality of light-emitting means with a first light amount and beginning to turn on the light-emitting means farthest from the key of interest with a second light amount higher than said first light amount at a timing going back an arbitrary time period from said ON-key timing, sequentially turning on the subsequent light-emitting means with said second light amount, and turning on the light-emitting means closest to the key of interest with said second light amount at said ON-key timing.

17. The method according to claim 15, wherein said control step includes the step of changing a shift time of said ON position on the basis of ON-key strength information of the key of interest.

18. The method according to claim 15, wherein said control step includes the step of controlling display on fingerwork information display means for displaying fingerwork information of the key of interest as well as said plurality of light-emitting means.

19. A program for indicating at least an ON-key position and timing of a keyboard on the basis of input performance information, said program causing a computer to execute:

the control step of controlling ON and OFF operations of a plurality of light-emitting means provided for each key on said keyboard, and lining up in a direction perpendicular to the pitch direction of said keyboard, said control step including the step of shifting an ON position of said plurality of light-emitting means in turn from the upper light-emitting means toward a key of interest, on the basis of an ON-key timing of the key of interest.

20. The program according to claim 19, wherein said control step includes the step of turning on all of said plurality of light-emitting means with a first light amount and beginning to turn on the light-emitting means farthest from the key of interest with a second light amount higher than said first light amount at a timing going back an arbitrary time period from said ON-key timing, sequentially turning on the subsequent light-emitting means with the second light amount, and turning on the light-emitting means closest to the key of interest with said second light amount at said ON-key timing.

21. The program according to claim 19, wherein said control step includes the step of changing a shift time of said ON position on the basis of ON-key strength information of the key of interest.

22. The program according to claim 19, wherein said control step includes the step of controlling display on fingerwork information display means for. displaying fingerwork information of the key of interest as well as said plurality of light-emitting means.

23. A computer-readable recording medium recording thereon a program for indicating at least an ON-key position and timing of a keyboard on the basis of input performance information, said program causing a computer to execute:

the control step of controlling ON and OFF operations of a plurality of light-emitting means provided for each key on said keyboard, and lining up in a direction perpendicular to the pitch direction of said keyboard, said control step including the step of shifting an ON position of said plurality of light-emitting means in turn from the upper light-emitting means toward a key of interest, on the basis of an ON-key timing of the key of interest.

24. The medium according to claim 23, wherein said control step includes the step of turning on all of said plurality of light-emitting means with a first light amount and beginning to turn on the light-emitting means farthest from the key of interest with a second light amount higher than said first light amount at a timing going back an arbitrary time period from said ON-key timing, sequentially turning on the subsequent light-emitting means with said second light amount, and turning on the light-emitting means closest to the key of interest with said second light amount at said ON-key timing.

25. The medium according to claim 23, wherein said control step includes the step of changing a shift time of said ON position on the basis of ON-key strength information of the key of interest.

26. The medium according to claim 23, wherein said control step includes the step of controlling display on fingerwork information display means for displaying fingerwork information of the key of interest as well as said plurality of light-emitting means.

* * * * *